United States Patent
Asorey Blazquez

(10) Patent No.: US 12,549,044 B2
(45) Date of Patent: Feb. 10, 2026

(54) ROTOR FOR A PERMANENT MAGNET ELECTRICAL MACHINE

(71) Applicant: Equipmake Ltd, Snetterton (GB)

(72) Inventor: Angel Asorey Blazquez, Norwich (GB)

(73) Assignee: Equipmake Ltd, Snetterton (GB)

( * ) Notice: Subject to any disclaimer, the term of this patent is extended or adjusted under 35 U.S.C. 154(b) by 209 days.

(21) Appl. No.: 18/553,907

(22) PCT Filed: Apr. 5, 2022

(86) PCT No.: PCT/GB2022/050849
§ 371 (c)(1),
(2) Date: Oct. 4, 2023

(87) PCT Pub. No.: WO2022/214798
PCT Pub. Date: Oct. 13, 2022

(65) Prior Publication Data
US 2024/0186850 A1    Jun. 6, 2024

(30) Foreign Application Priority Data
Apr. 5, 2022 (GB) ..................................... 2105065

(51) Int. Cl.
*H02K 1/276* (2022.01)
*H02K 1/28* (2006.01)

(52) U.S. Cl.
CPC .............. *H02K 1/276* (2013.01); *H02K 1/28* (2013.01)

(58) Field of Classification Search
CPC .......... H02K 1/276; H02K 1/28; H02K 29/03; H02K 2201/06; H02K 1/2766;
(Continued)

(56) References Cited

U.S. PATENT DOCUMENTS

2013/0187505 A1   7/2013  Senoo
2013/0249345 A1*  9/2013  Kaiser ............... H02K 1/2766
                                                  310/216.009
(Continued)

FOREIGN PATENT DOCUMENTS

DE   102017011412 A1   6/2018
EP        2348612 A1   7/2011
(Continued)

OTHER PUBLICATIONS

Search Report issued in connection with United Kingdom Patent Application No. GB 2105065.3, United Kingdom Intellectual Property Office, Sep. 15, 2021.

*Primary Examiner* — Christopher M Koehler
*Assistant Examiner* — Riley Owen Stout
(74) *Attorney, Agent, or Firm* — Kolitch Romano Dascenzo Gates LLP

(57) ABSTRACT

A rotor (2) for a permanent magnet electrical machine comprises a hub (10) having a central rotational reference axis, and first and second sets (4,6) of rotor segments (60). Each segment includes at least one permanent magnet (20), with the permanent magnets of the first set offset in the circumferential direction relative to the permanent magnets of the second set, and an engagement portion (16) shaped to engage mechanically with the hub so as to resist radial forces, and having a radially extending central axis (70) in a plane extending perpendicular to the central rotational reference axis. In each rotor segment of the first set, the centre of mass of its magnet(s) is circumferentially offset from the central axis of the respective engagement portion, and the segment is shaped such that the centre of mass (68) of the segment is substantially aligned with the central axis (70) of the respective engagement portion.

5 Claims, 3 Drawing Sheets

(58) Field of Classification Search
CPC ........ H02K 1/274; H02K 15/03; H02K 21/14; H02K 15/028; H02K 21/24
See application file for complete search history.

(56) References Cited

U.S. PATENT DOCUMENTS

| | | |
|---|---|---|
| 2019/0207444 A1 | 7/2019 | Wolf et al. |
| 2020/0083765 A1 | 3/2020 | Kurronen et al. |
| 2020/0177039 A1* | 6/2020 | Torrey ................. H02K 1/2773 |

FOREIGN PATENT DOCUMENTS

| | | |
|---|---|---|
| EP | 2840692 A2 | 2/2015 |
| WO | 2021043354 A1 | 3/2021 |

* cited by examiner

ROTOR FOR A PERMANENT MAGNET ELECTRICAL MACHINE

FIELD OF THE DISCLOSURE

The present disclosure relates to a rotor for a permanent magnet electrical machine. More particularly, it concerns the configuration of the rotor segments of the rotor.

BACKGROUND TO THE DISCLOSURE

A rotor for a permanent magnet electrical machine such as a motor or generator may include a central hub with sets of permanent magnets and rotor segments arranged around its periphery. Such rotors may operate at very high rotational speeds and so need to be designed so as to reliably retain the magnets and segments in position against high centrifugal and magnetic forces.

SUMMARY OF THE DISCLOSURE

The present disclosure provides a rotor for a permanent magnet electrical machine, wherein the rotor comprises:
a hub having a central rotational reference axis; and
first and second sets of rotor segments, with the first set extending around the circumferential surface of the hub at a different axial location to the second set,
wherein each segment includes:
at least one permanent magnet, with the permanent magnets of the first set offset in the circumferential direction relative to the permanent magnets of the second set, and
an engagement portion shaped to engage mechanically with the hub so as to resist radial forces, and having a radially extending central axis in a plane extending perpendicular to the central rotational reference axis,
and wherein, in each rotor segment of the first set, the centre of mass of its magnet(s) is circumferentially offset from the central axis of the respective engagement portion, and
the segment is shaped such that the centre of mass of the segment is substantially aligned with the central axis of the respective engagement portion.

Preferably, the segment is shaped such that the centre of mass of the segment lies on the central axis of the respective engagement portion.

The permanent magnets of a first set of segments may be offset in the circumferential direction relative to the permanent magnets of the second set with a view to minimising cogging torque. However, the inventor realised that this would result in segments of the first set having a force exerted thereon (during rotation of the rotor) which would act to rotate each segment relative to the hub, as a result of an offset in the circumferential direction between the radial centre line of the engagement portion and the centre of mass of the segment. This would lead to stresses being distributed relatively unevenly over the segment, thereby increasing the risk of mechanical failure.

According to the present disclosure, each segment of a set is shaped such that the effect of a circumferential offset of its magnet(s) relative to the engagement portion on the circumferential weight distribution of the segment is compensated for by shaping the segment such that its centre of mass is substantially in alignment with the radial central axis of the respective engagement portion. This arrangement serves to minimise any turning force experienced by each segment relative to the hub due to the circumferential offsetting of its at least one magnet.

The radial central axis of the engagement portion may extend through the centre of mass of the engagement portion. Preferably, the engagement portion is symmetrical about the radial central axis in a plane extending perpendicular to the central rotational reference axis of the rotor hub. The engagement portion may be symmetrical about a plane which includes its radial central axis and the central rotational reference axis of the rotor hub.

The radially extending side walls of each rotor segment of the first set (or of both the first and second sets) may be asymmetrical with respect to a radial line extending through the centre of mass of its magnet(s) in a cross-sectional plane perpendicular to the central rotational reference axis, such that the centre of mass of the segment is substantially aligned with the central axis of the respective engagement portion.

The segments of the first set (or of both the first and second sets) may be asymmetrical in a plane extending perpendicular to the central rotational reference axis of the rotor hub. Each of the segments of the first set (or of both the first and second sets) may have the same circumferential profile in a cross-sectional plane extending perpendicular to the central rotational reference axis of the rotor hub.

In some implementations, each rotor segment may include two permanent magnets. In other examples, each rotor segment may contain a single magnet, or more than two magnets.

The at least one magnet of each segment may be retained within the respective segment. It may be surrounded by the body of the segment in a plane extending perpendicular to the central rotational reference axis of the rotor hub.

In a preferred configuration, the engagement portion of each segment is in the form of a projection received by the rotor hub. Each engagement portion may be received by a region of the hub having a substantially complementary shape. The projection may be received in an axially extending groove defined in the outer circumferential surface of the hub. The projection may have a dovetail shape in a cross-sectional plane extending perpendicular to the central rotational reference axis of the rotor hub.

Preferably, each rotor segment of the first set (or of both the first and second sets) overlaps with an adjacent segment of the first set in the circumferential direction. More particularly, each rotor segment of the first set (or of both the first and second sets) may extend partway beneath an adjacent segment of the first set in the circumferential direction.

In some preferred implementations, each rotor segment of the first set (or of both the first and second sets) includes a pair of permanent magnets,
each of the pair of permanent magnets, in a cross-sectional plane extending perpendicular to the central rotational reference axis, is elongate, has an inner end closer to the centre of mass of the segment than an outer end, and is inclined such that its inner end is closer to the central rotational reference axis, and
each rotor segment of the first set (or of both the first and second sets) extends at least partway beneath a permanent magnet of an adjacent segment in the circumferential direction.

BRIEF DESCRIPTION OF THE DRAWINGS

Examples of the present disclosure will now be described by way of example and with reference to the accompanying schematic drawings, wherein.

DETAILED DESCRIPTION

Figure 1:
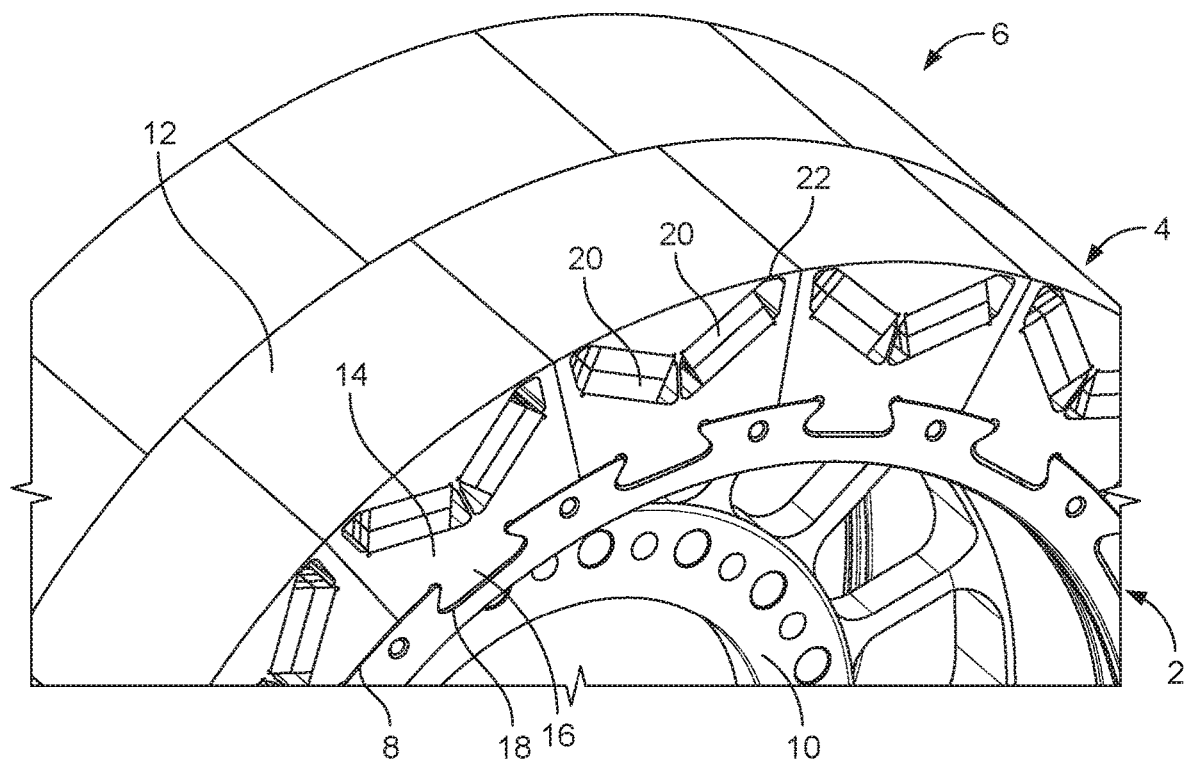
FIG. 1 is a perspective view of an upper portion of a rotor of a permanent magnet electrical machine.

FIGS. 1 to 4 show an upper portion of a rotor 2 which includes two adjacent sets of rotor segments 4 and 6. The rotor segments are carried on the outer circumferential surface 8 of the rotor hub 10.

The hub 10 is formed by machining a solid piece of material, by an additive manufacturing process, or preferably by casting. It may comprise steel or aluminium, for example.

Each set of segments is arranged in a ring around the hub, with one set axially displaced relative to the other, in the direction of the rotational reference axis of the hub. The segments may be formed of laminated steel, for example.

Each rotor segment 12 includes a body portion 14 and an engagement portion 16. The engagement portion is shaped to engage mechanically with the hub so as to resist displacement of the segment relative to the hub by radial forces acting on the segment.

In the example shown in FIGS. 1 to 4, each rotor segment includes an engagement portion in the form of a radially inwardly extending projection 16. In other implementations, the engagement portion may instead be in the form of a groove which receives an outwardly extending projection that forms part of the hub 10.

In FIGS. 1 to 4, the projection 16 is substantially in the shape of a dovetail in a plane extending perpendicular to the rotational reference axis of the hub. The projection is received in an axially extending groove 18 defined by the radially outwardly facing circumferential surface of the rotor hub 10. The cross-sectional shape of the groove is substantially complementary to the cross-sectional shape of the projection 16. The groove extends in a straight line across the width of the hub in the axial direction and also receives the projections of the other set (6) of segments.

Each rotor segment may contain a pair of magnets 20. Each magnet is held within a respective cut-out 22 defined by the body portion 14 of its rotor segment. The magnets are spaced apart in the circumferential direction and have their centres of mass located at the same distance from the central axis of the hub.

Figure 2:
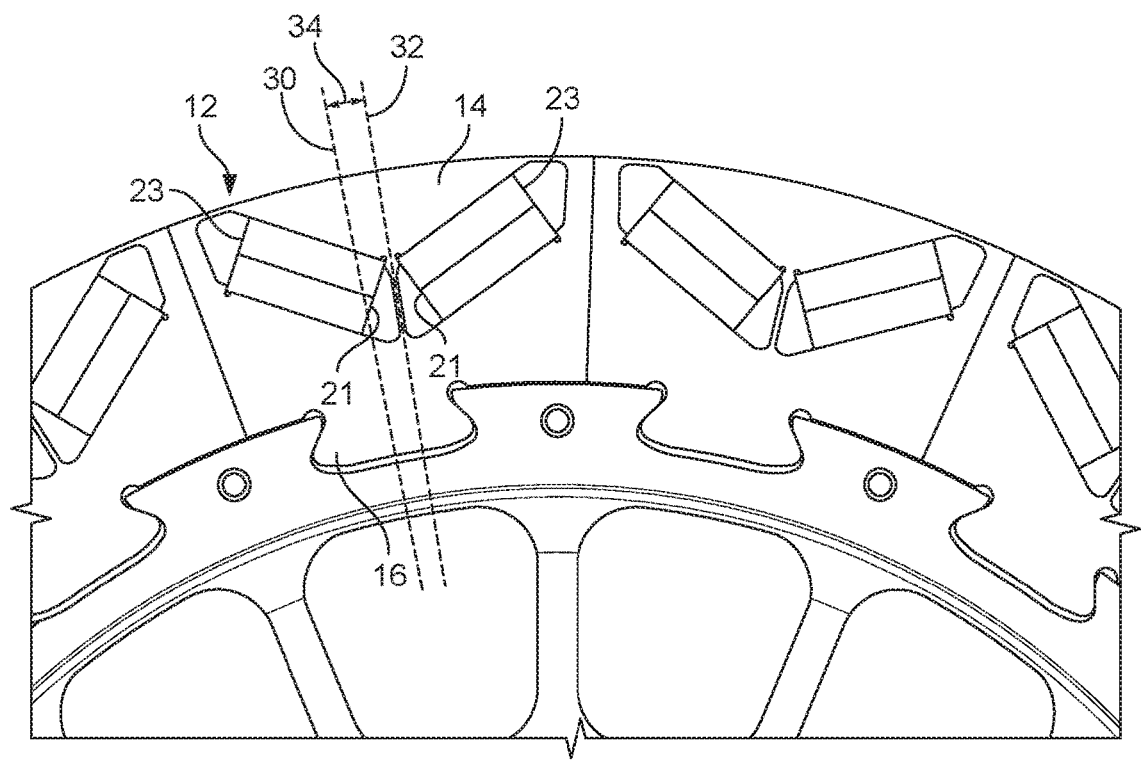
FIGS. 2 to 4 are cross-sectional views of the upper rotor portion shown in FIG. 1.

Each magnet may be elongated when viewed in a cross-sectional plane perpendicular to the central rotational reference axis of the hub (as shown in FIGS. 1 and 2). Each magnet is inclined when viewed in this plane such that its inner end 21 (which closer to the centre of mass of the segment than its outer end 23) is nearer to the centre of the rotor hub than its outer end 23.

In other implementations, each rotor segment may contain a single magnet, or more than two magnets.

As can be seen in FIG. 2, each segment of one set 4 is configured such that a radial central reference line or axis 30 of the projection 16 of each segment is spaced by an offset 34 in the circumferential direction from a radial central reference line or axis 32 of the body portion 14 of the segment. Radial axis 32 extends between the magnets of the pair 20. The projection is symmetrical in a plane perpendicular to the rotational axis of the rotor about its central axis 30. The body portion 14 is symmetrical in that plane about its central axis 32. This offset may also be present in the other set (6) of rotor segments visible in FIG. 1, but in the opposite circumferential direction. In that configuration, the rotor segments of both sets may be identical, with one set reversed relative to the other in the assembled rotor. Each set is offset or skewed in the circumferential direction relative to the other. An offset in the circumferential direction between two sets of rotor segments serves to minimise the effects of cogging torque.

However, in a rotor configured in accordance with FIGS. 1 to 4, the segments of set 4 will experience forces acting to rotate each segment relative to the rotor hub, as the centre of mass of the segment is not aligned circumferentially with the central axis 30 of the projection 16, when the rotor is rotated about its central axis. This may lead to formation of undesirable air gaps between the segments and the rotor hub. Increasing the dimensional accuracy of the surfaces of the segment and rotor hub which inter-engage may reduce this effect, but to do so would increase manufacturing costs.

Also, these rotational forces tend to lead to uneven distribution of stresses on the segment and rotor hub. This is shown in the simulation result depicted in FIG. 3, which shows in different shades the different stresses experienced over the transverse cross-section of these components during rotation of the rotor, with a darker shade indicating a higher stress. It can be seen that the stresses are unevenly distributed, and that higher stresses occur around corner 40 of groove 18 compared to corner 42. Similarly, higher stresses are experienced around the junction 44 between the projection 16 and the body portion 14 on one side, compared to the junction 46 on the other side of the projection.

The radii of the junctions 44 and 46 may be increased to reduce the concentration of stress at these locations. However, this may be detrimental to the electromagnetic performance of the rotor, as it removes material from the segment body at a location where magnetic flux flows from one magnet of the segment to the other. This will tend to increase the magnetic circuit reluctance, which will in turn impede magnetic flux entering the air gap between the rotor and a surrounding stator to produce torque.

Figure 4:
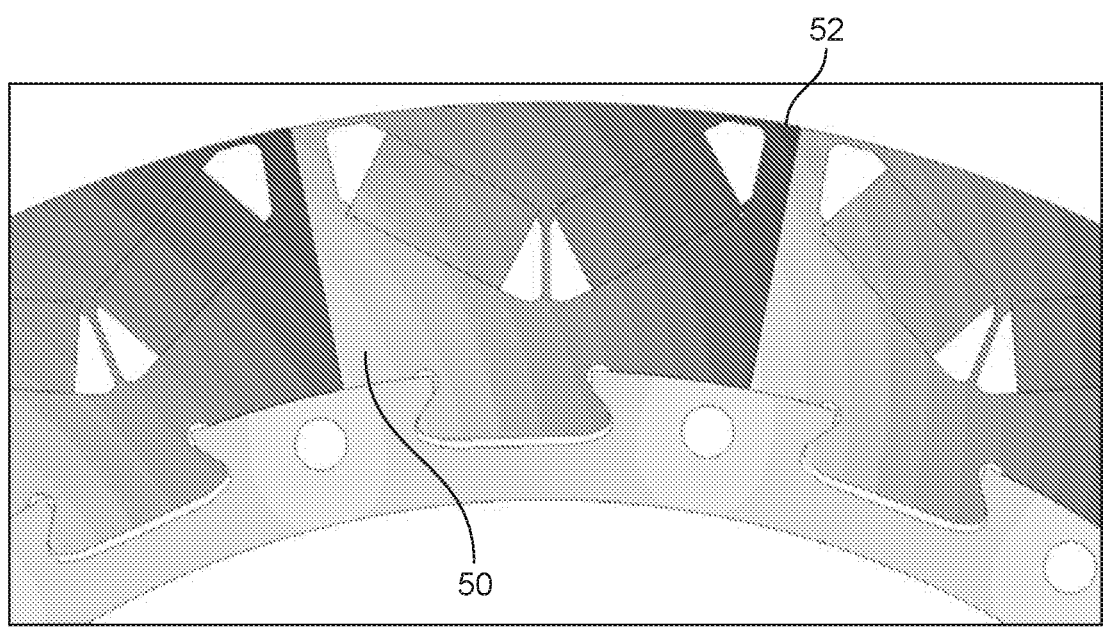

FIG. 4 shows the result of simulating the extent to which different parts of a segment are likely to shift during rotation of the rotor. A darker shade indicates a greater shift. The rotational forces exerted on the segment due to offset 34 shown in FIG. 2 tend to lead to the side 52 of the rotor segment which is circumferentially further from the projection moving further from the centre of the hub than the opposite side 50.

Figure 5:
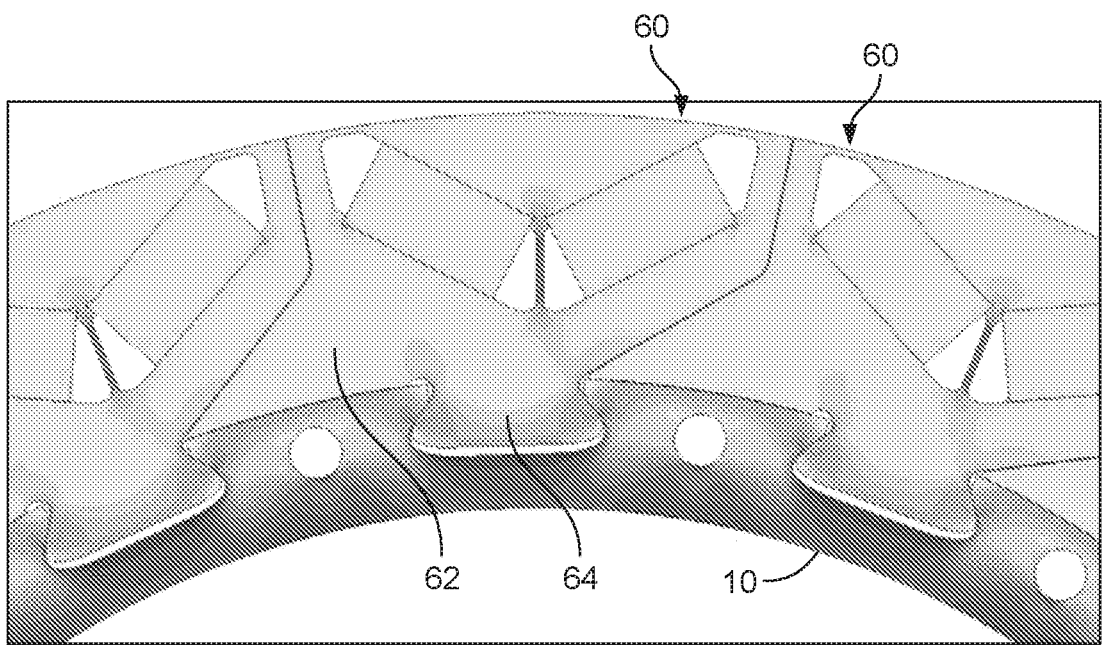
FIGS. 5 and 6 are cross-sectional views of an upper portion of a rotor according to an example of the present disclosure.
Figure 6:
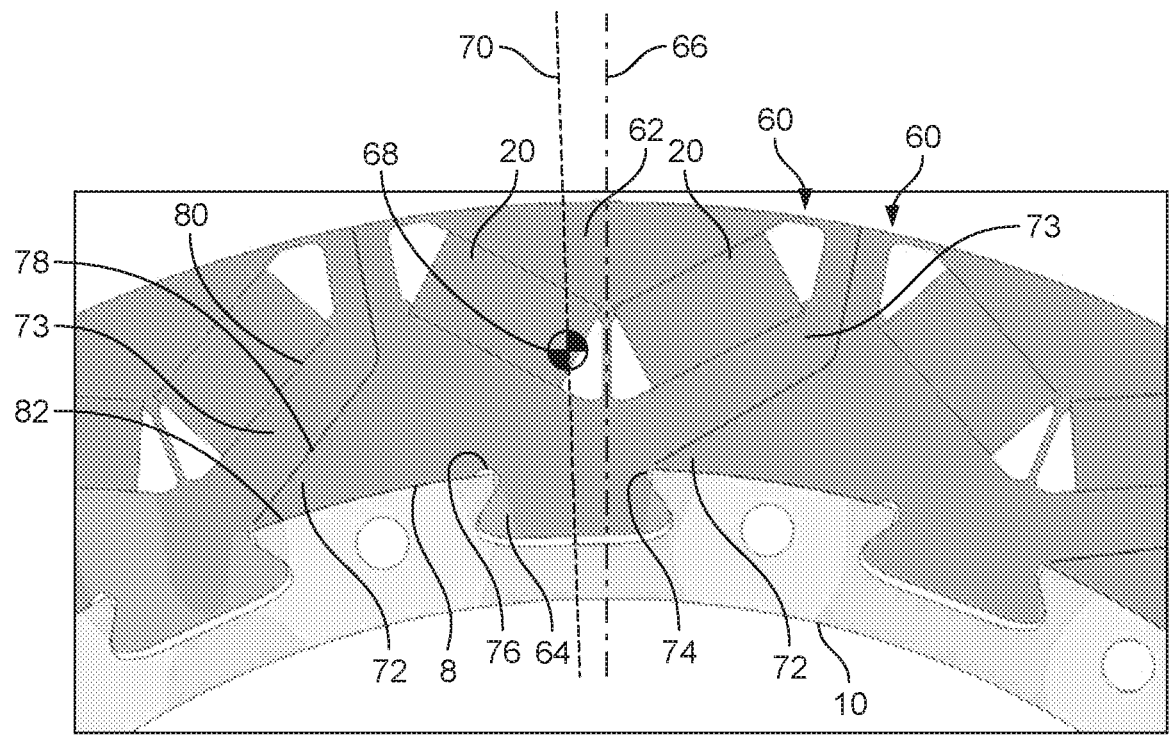

FIGS. 5 and 6 are cross-sectional views of rotor segments 60 according to an example of the present disclosure. Each segment includes a body portion 62 and a projection 64. The magnets 20 are inclined in a similar manner to those of the segments shown in FIGS. 1 to 4.

The body portion 62 is asymmetrical in the plane of the drawing about a radial axis 66 which extends between the magnets 20. The mass of the body portion is distributed about its radial axis 66 such that the centre of mass 68 of the segment lies on the radial central reference axis 70 of the projection 64. The cross-sectional shape of each rotor segment may be uniform in the axial direction.

The body portion 62 includes an extension 72 which extends in one circumferential direction partway beneath an adjacent segment and preferably partway beneath a magnet of the adjacent segment. The extension may be tapered such that its width decreases with distance from the centre of the segment. The upper surface 78 of the extension may lie in a plane which is substantially parallel to a plane defined by a radially inwardly facing inclined surface 80 of the magnet above it. The lower surface 82 of the extension may be in contact with the outer circumferential surface 8 of the hub 10.

The body portion 62 may be cut away in a complementary manner along the circumferentially opposite side 73 so as to accommodate the extension 72 of the adjacent segment on the opposite side. In this way, the centre of mass of the segment 68 is shifted relative to its magnets in the circumferential direction so as to coincide with the central reference axis 70 of the projection 64. Accordingly, the centrifugal force acting on the segment during rotation of the rotor is aligned with the central axis of the projection 64 and so there is no resultant mechanical moment relative to the hub acting on the segment.

FIG. 5 shows the result of a simulation of stresses experienced during rotation of a rotor including rotor segments 60 according to an example of the present disclosure. It can be seen that the stresses are lower, more evenly distributed, and more symmetrically distributed relative to the central radial axis 70 of the projection 64, relative to those shown in FIG. 3.

FIG. 6 is shaded to show the result of a simulation of displacement of the segment during rotation of the rotor. The magnitude of any displacement is significantly reduced compared to those predicted by the simulation shown in FIG. 4, as indicated by the lighter and more uniform shading.

Figure 3:
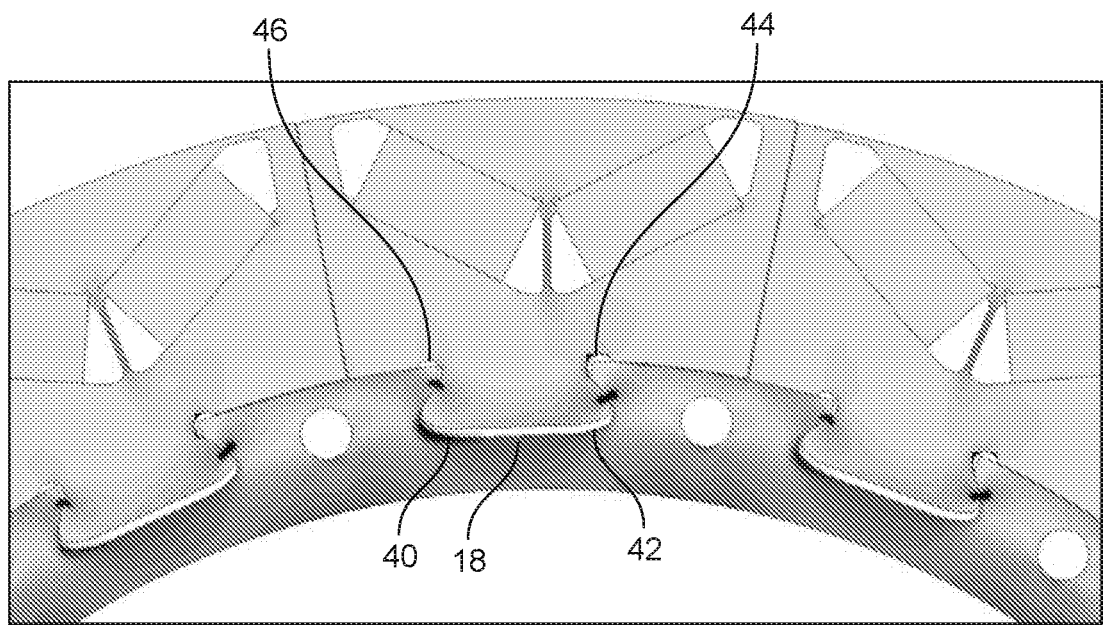

As lower stresses are experienced by the hub and segment configuration shown in FIGS. 5 and 6, the radius of junctions 74 and 76 may be reduced compared to their counterparts 44 and 46 shown in FIG. 3 for a given resistance of the rotor segment to centrifugal forces. Furthermore, a given resistance to centrifugal forces may be achieved with lower manufacturing tolerances, thereby reducing the cost of manufacture.

The magnets of the rotor segments shown in FIGS. 5 and 6 are offset in the circumferential direction relative to those of an adjacent set. Preferably, the rotor segments of both sets are identical, with one set reversed in the circumferential direction relative to the other in the assembled rotor.

The invention claimed is:

1. A rotor for a permanent magnet electrical machine, wherein the rotor comprises:
 a hub having a central rotational reference axis; and
 first and second sets of rotor segments, with the first set extending around a circumferential surface of the hub at a different axial location to the second set,
 wherein each rotor segment includes:
  at least one permanent magnet retained within the rotor segment, with the permanent magnets of the first set offset in a circumferential direction relative to the permanent magnets of the second set, and
  a single engagement portion shaped to engage mechanically with the hub so as to resist radial forces, and having a radially extending central axis in a plane extending perpendicular to the central rotational reference axis,
 and wherein, in each rotor segment of the first set, a centre of mass of the respective magnet(s) retained within the rotor segment is circumferentially offset from the central axis of the respective single engagement portion, and
 each rotor segment is shaped such that a centre of mass of the rotor segment and the respective magnet(s) is substantially aligned with the central axis of the respective single engagement portion.

2. The rotor of claim 1, wherein radially extending side walls of each rotor segment of the first set are asymmetrical with respect to a radial line extending through the centre of mass of the magnets in a cross-sectional plane perpendicular to the central rotational reference axis.

3. The rotor of claim 1, wherein each rotor segment of the first set overlaps with an adjacent rotor segment of the first set in the circumferential direction.

4. The rotor of claim 1, wherein each rotor segment of the first set extends partway beneath an adjacent rotor segment of the first set in the circumferential direction.

5. The rotor of claim 1, wherein:
 each rotor segment of the first set includes a pair of permanent magnets,
 each of the pair of permanent magnets, in a cross-sectional plane extending perpendicular to the central rotational reference axis, is elongate, has an inner end closer to the centre of mass of the rotor segment than an outer end, and is inclined such that its inner end is closer to the central rotational reference axis, and
 each rotor segment of the first set extends at least partway beneath a permanent magnet of an adjacent rotor segment in the circumferential direction.

* * * * *